US00RE44299E

(19) United States
(12) Reissued Patent
Backman

(10) Patent Number: US RE44,299 E
(45) Date of Reissued Patent: Jun. 11, 2013

(54) SYSTEM AND METHOD FOR ENABLING AUTOMATED RUN-TIME INPUT TO NETWORK BOOTSTRAPPING PROCESSES

(75) Inventor: Drake Backman, Orem, UT (US)

(73) Assignee: Novell Intellectual Property Holdings, Inc., Seattle, WA (US)

(21) Appl. No.: 12/756,653

(22) Filed: Apr. 8, 2010

Related U.S. Patent Documents

Reissue of:
(64) Patent No.: 7,356,685
Issued: Apr. 8, 2008
Appl. No.: 11/171,266
Filed: Jul. 1, 2005

(51) Int. Cl.
*G06F 15/177* (2006.01)
*G06F 1/24* (2006.01)

(52) U.S. Cl.
USPC ..... 713/2; 713/1; 709/219; 709/222; 709/238; 701/1

(58) Field of Classification Search
USPC ..... 713/1, 2; 709/219, 222, 238; 701/1
See application file for complete search history.

(56) References Cited

U.S. PATENT DOCUMENTS

| | | | | |
|---|---|---|---|---|
| 6,560,699 | B1 | 5/2003 | Konkle | 713/1 |
| 6,598,057 | B1 | 7/2003 | Synnestvedt et al. | 707/200 |
| 6,735,692 | B1 | 5/2004 | Murphrey et al. | 713/1 |
| 6,810,478 | B1 | 10/2004 | Anand et al. | 713/2 |
| 7,013,385 | B2 | 3/2006 | Abbondanzio et al. | 713/2 |
| 7,085,921 | B2 | 8/2006 | Frye, Jr. | 713/1 |
| 7,159,106 | B2 | 1/2007 | Meaney et al. | 713/2 |
| 2003/0005096 | A1* | 1/2003 | Paul et al. | 709/222 |
| 2003/0005276 | A1* | 1/2003 | French et al. | 713/2 |
| 2003/0217126 | A1 | 11/2003 | Polcha et al. | 709/220 |
| 2004/0049671 | A1* | 3/2004 | Miyamoto et al. | 713/2 |
| 2004/0268340 | A1 | 12/2004 | Steeb et al. | 717/174 |
| 2005/0097310 | A1* | 5/2005 | Chu et al. | 713/2 |
| 2006/0047792 | A1 | 3/2006 | Dharmarajan et al. | 709/220 |
| 2006/0129788 | A1 | 6/2006 | Maeda et al. | 713/1 |
| 2006/0143146 | A1 | 6/2006 | Bognar | 707/1 |

* cited by examiner

*Primary Examiner* — Vincent Tran
(74) *Attorney, Agent, or Firm* — Pillsbury Winthrop Shaw Pittman LLP

(57) ABSTRACT

A system and method are provided for enabling runtime parameter value input into a computer device during a network bootstrapping process. The system and method may use a memory block to store values needed at runtime that are ordinarily input by a user. A configuration file having one or more macros included may be stored at a TFTP server. A first bootstrap program is loaded on the computer device to initialize a memory block with the name of the configuration file to be used by the computer device during booting and the values for any macros included in the configuration file. The first bootstrap program then calls a second bootstrap program to parse the memory block and/or the configuration file in order to use the contents of the configuration file to boot the computer device. Using macros in the configuration files enable the same configuration file to be used by devices with differing booting needs.

33 Claims, 4 Drawing Sheets

300

| Length | Purpose | |
|---|---|---|
| 4 bytes | Signature | 302 |
| 4 bytes | Version | 304 |
| 4 bytes | Memory Block Length | 306 |
| 2 bytes | No. of Macro-Value Pairs | 308 |
| Variable | MACRO-VALUE | 310 |

FIG. 3

SYSTEM AND METHOD FOR ENABLING AUTOMATED RUN-TIME INPUT TO NETWORK BOOTSTRAPPING PROCESSES

Matter enclosed in heavy brackets [ ] appears in the original patent but forms no part of this reissue specification; matter printed in italics indicates the additions made by reissue.

FIELD OF THE INVENTION

The invention relates to a system and method for providing automated run-time input to network bootstrap processes.

BACKGROUND OF THE INVENTION

During the startup of a computer device, a process commonly known as "booting" or "bootstrapping" is executed. The bootstrapping process employs a "bootstrap" program that contain a specific set of instructions to initialize and load the operating system that manages the computer device. Traditionally, such bootstrap programs were stored in the computer device's memory.

Many computer devices, however, currently support network booting processes that enable the devices to communicate with a remote server and obtain system files over a network. Examples of such processes include the use of the Pre-boot Execution Environment (PXE) to download an operating system from a network. Generally, for such processes, the computer device is configured with some type of code in non-volatile memory that will enable the device to obtain the identity of the appropriate bootstrap program from the remote server. The computer device may then gain access and load the identified bootstrap program from a remote file server. Once loaded, the bootstrap program then obtains the operating system image used to manage the device.

Existing network bootstrap programs are geared towards allowing the user to have the flexibility to boot in almost any manner he chooses. These programs typically require entry of input parameters by the user during the run time of the bootstrapping process and, therefore, have no mechanisms to automate the boot selection process or the entry of input parameters.

SUMMARY OF THE INVENTION

A system and method are provided for enabling automated run-time input during a network bootstrapping process. The system may include on or more computer devices communicatively coupled to a management server and a TFTP server. The management server may store one or more boot options used to provide a first set of bootstrap instructions. The TFTP server may store one or more configuration files used to control the boot process of the computer device. Each configuration file may include one or more macros.

The first set of bootstrap instructions may include a boot determination module and an initialization module. The boot determination module may be configured to determine an appropriate configuration file for the computer device and to determine the values for any macros included in the configuration file.

The initialization module may be configured to choose an arbitrary block of memory not used for other processing. This block of memory may be used to store the name of the configuration file and the values of the macros, as determined by the boot determination module.

When a computer device first powers on, a request may be sent to the management server to obtain a first set of bootstrap instructions. The first set of bootstrap instructions then determines a configuration file corresponding to the computer device based in part on a unique attribute associated with the computer device.

A memory block is then initialized with the name of the configuration file and values for any macros in the configuration file. The first set of bootstrap instructions then launches a second set of bootstrap instructions used to initiate the booting of the computer device.

The second set of bootstrap instructions may parse the memory block to determine the needed configuration file. The second set of bootstrap instructions may then parse the configuration file, resolving any macros by referring to the memory block.

BRIEF DESCRIPTION OF THE DRAWINGS

FIG. 3 depicts a sample memory block, in accordance with various embodiments of the invention.

DETAILED DESCRIPTION OF PREFERRED EMBODIMENTS

In accordance with the various disclosed embodiments, the present invention contemplates systems and methods that enable automated run-time input to network bootstrap processes. These systems and methods allow a determination to be made at boot time whether a computer device should boot the operating system installed in the computer device's memory or download and boot a special purpose operating system to accomplish an assigned task. The required input parameters may be supplied without user input or intervention. For example, a memory block may be initialized to store parameter values that would otherwise require user input.

Figure 1:
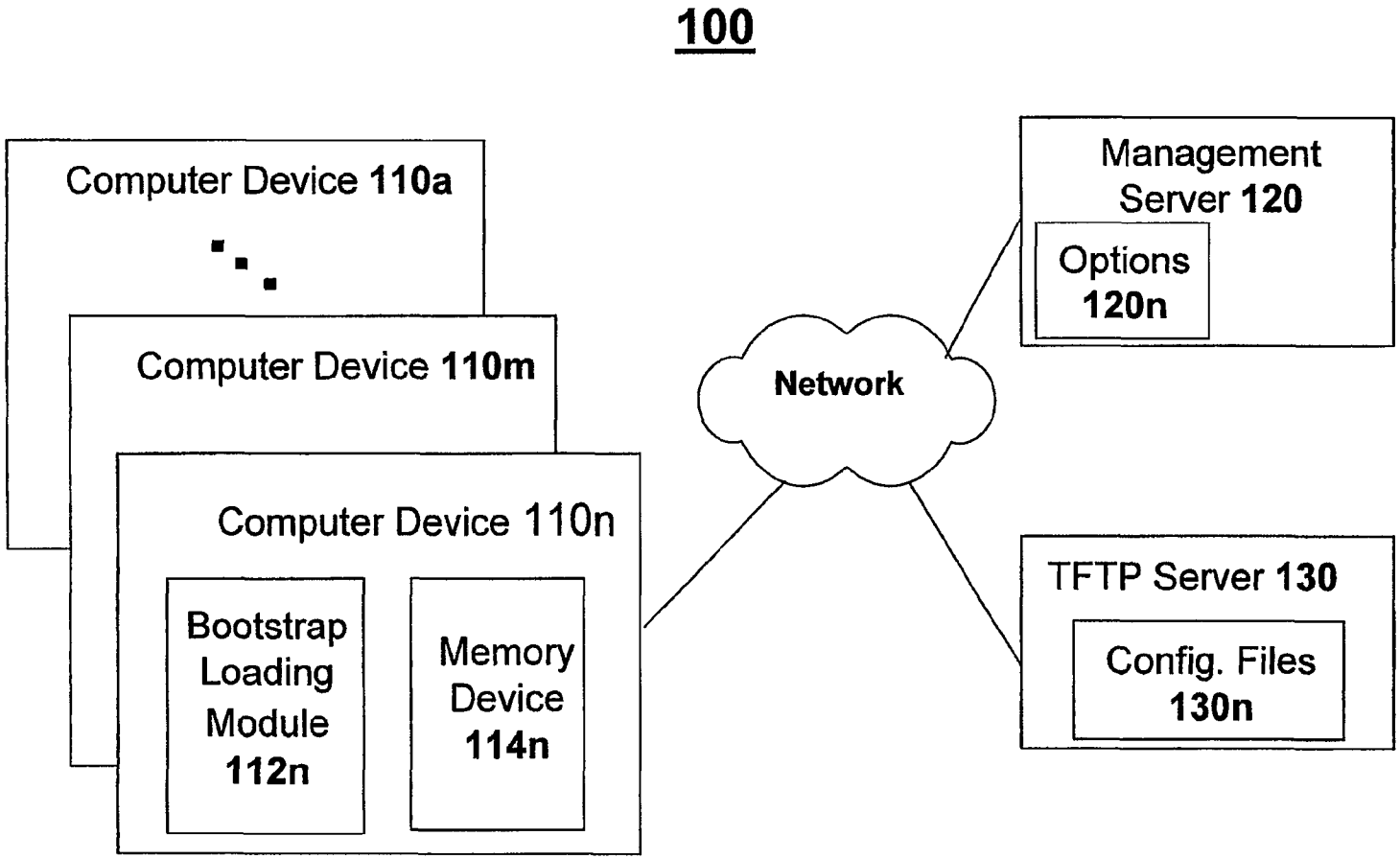
FIG. 1 depicts a system enabling run-time input, in accordance with various embodiments of the invention.

Consistent with these embodiments, FIG. 1 depicts system 100 that includes one or more computer devices 11a-n communicatively coupled, via a network, to management server 120. According to some embodiments of the invention, system 100 further includes trivial file transport protocol (TFTP) server 130. It will be appreciated that the network may comprise a local area network (LAN), wide area network (WAN), an intranet, the Internet, or any other type of network suitable for such purposes. Furthermore, while management server 120 and TFTP server 130 are illustrated as separate devices, a single server mechanism may be used.

As depicted in FIG. 1, computer device 110n may include a bootstrap loading module 112n and a memory device 114n. Memory device 114n may be a portion of an internal memory device within computer device 110n. Upon startup, computer device 110n may be configured to contact management server 120 to request the identity of a bootstrap program. Bootstrap loading module 112n may be configured to retrieve the identified bootstrap program from management server 120 and install and execute the bootstrap program.

Management server 120 may be configured to store boot options 120n consistent with the operation of computer device 110n. According to some embodiments of the invention, management server 120 may comprise a PXE boot server.

TFTP server 130 may be constructed and arranged to store one or more configuration files 130n. Such configuration files may be designed to enable run-time inputs to a bootstrap program, in accordance with various embodiments of the present invention. Configuration file 130n may include one or more macros. The macros enable configuration file 130n to be used by a plurality of computer devices having different booting requirements. For example, configuration file 130n may store kernel parameters, such as, for example, the IP address of a policy server. By including a macros instead of the actual value of the parameter, the configuration file may be used by devices with differing parameters.

Figure 2:
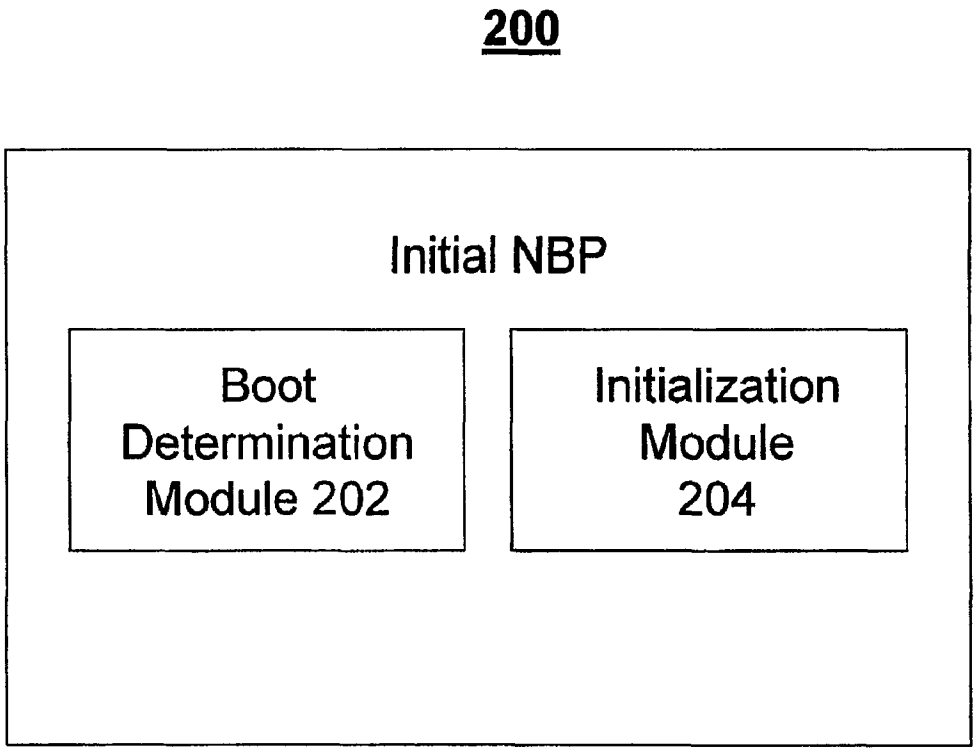
FIG. 2 depicts a block diagram of an initial bootstrap program, in accordance with various embodiments of the invention.

As noted above, when computer device 110n is powered on, it is configured to send a bootstrap request to management server 120. In response to this request, computer device 110n may receive an initial bootstrap program 200. As depicted in FIG. 2, initial bootstrap program 200 may include one or more modules, such as, for example, boot determination module 202 and initialization module 204. Boot determination module 202 may be configured to determine how computer device 110n should boot. For example, boot determination module 202 may determine whether computer device 110n should boot using PXELINUX or some other boot loading application.

Boot determination module 202 may also determine which configuration file 130n should be used. For example, determining which configuration file 130n to use may be determined by analyzing the computer's MAC address, serial number, hardware profile, and/or other characteristics. Boot determination module 202 may be configured to read data from the hard drive of computer device 110n to determine the appropriate configuration file. In other embodiments, the configuration file 130n may be passed to a second bootstrap program, which will be described below, via a custom DHCP tag.

Each configuration file 130a-130n may include macros as values for one or more fields. These macros may be resolved at runtime and their values substituted for the macro. As such, boot determination module 202 may also be configured to determine the values of any macros included in the selected configuration file. The appropriate configuration file and the appropriate values for macros within the configuration file may be determined by consulting a device profile associated with the computer device.

As noted above, initial bootstrap program 200 may also include an initialization module 204. Initialization module 204 may be configured to store the macro values and related information used in the configuration file 130n on computer device 110n. The stored information may be stored in a dedicated area of memory device 114n, that is, an area not used for other processing.

FIG. 3 depicts a sample block of memory 300 that may be used for storing macro values used by configuration file 130n. Memory block 300 may include signature 302 to identify the start of the memory block, a version field 304, a length field 306, a macro number field 308, and one or more macro-value fields 304. The contents of memory block 300 depicted in FIG. 3 are intended only to be exemplary. Additional and/or other values may be stored in memory block 300, as defined by an administrator.

The number of macro-value pairs in memory block 300 is determined by the requirements of the configuration file. According to some embodiments, the first macro-value pair in macro-value field 310 may indicate the name of the configuration file to use. The name and value for each macro used in the configuration file may then be included in subsequent fields.

Figure 4:
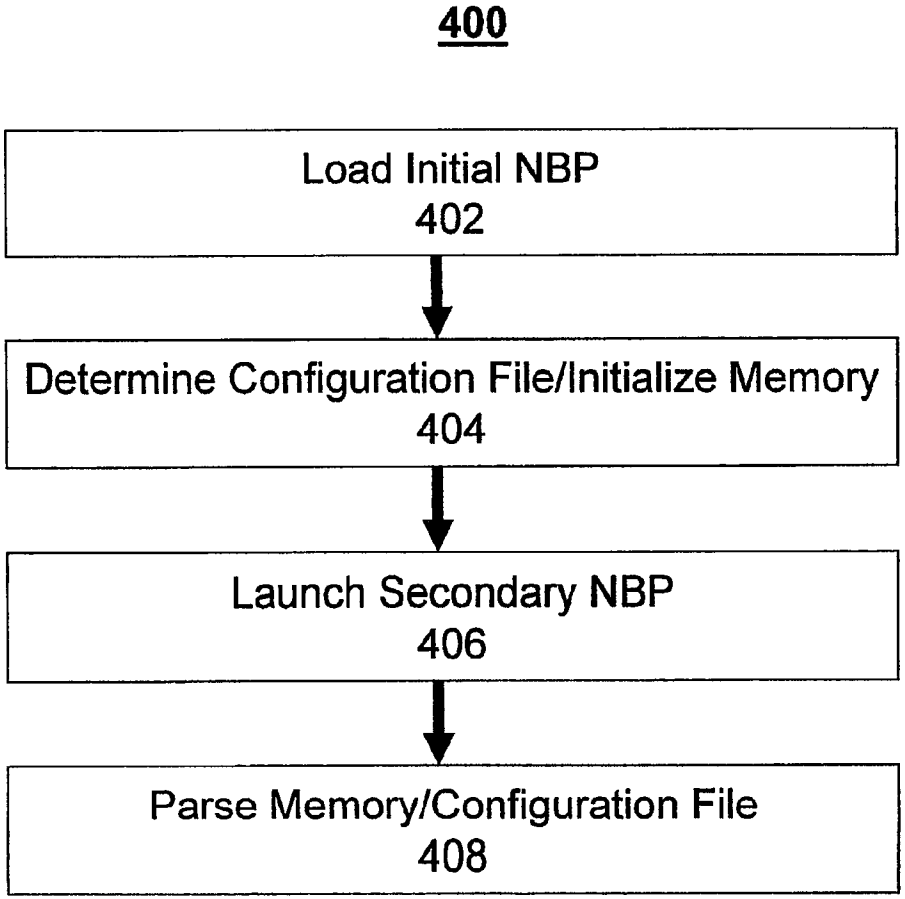
FIG. 4 depicts a process for configuring a computer device using run-time input, according to various embodiments of the invention.

Turning now to FIG. 4, a process 400 for configuring a computer device 110n with run-time input is presented, in accordance with embodiments of the present invention. As depicted at operation 402, an initial network bootstrap program (NBP) is loaded on computer device 110n. As noted above, this may occur as the result of a request from computer device 110n to management server 120 upon startup to determine how computer device 110n should boot. In some embodiments of the invention, computer device 110n may boot from its local hard drive. However, in other embodiments, computer device 110n may need to perform a specific task assigned by an administrator. As such, computer device 110n may be directed to download a specific bootstrap program to accomplish the specific task.

The initial NBP may be configured to determine the appropriate configuration file and to initialize a block of memory used to determine the appropriate configuration file and macro values, as depicted at operation 404. As discussed above, the appropriate configuration file may be determined by examining the MAC address and/or other device features. The device features may be compared to predetermined profiles to determine which configuration file is needed, and the values of any macros included in the configuration file. In other embodiments, the name of the configuration file may be passed to a secondary NBP.

As noted above, in addition to determining the appropriate configuration file at operation 404, the initial NBP may also initialize a memory block. Initializing the memory block may include storing the name of the appropriate configuration file and macro-value pairs used to resolve any macros in the configuration file. As discussed below, such initialization enables a secondary NBP to determine the appropriate configuration file and macro values.

Once the memory block has been initialized, a secondary NBP is launched, as depicted at operation 406. The initial NBP causes the secondary NBP to be loaded onto computer device 110n from management server 120. As depicted at operation 408, the secondary NBP may then parse the memory block to determine the appropriate configuration file. The secondary NBP enables the computer device to boot in accordance with the contents of the configuration file. As described above, the secondary NBP may receive the name of the configuration file through a customized DHCP tag, thus eliminating the need to parse the memory block to determine the appropriate configuration file. The secondary NBP may then parse the configuration file, looking up the values for any macros encountered in the configuration file by consulting the memory block.

An exemplary embodiment of the invention is further illustrated by the following example. Suppose that to boot a computer device for a specific task, the following configuration file is needed:

```
File Name: pxelinux.cfg/default
File Contents: Server_Location = 10.0.0.1
```

If this same service is deployed on a different server, then that server would need its own copy of "pxelinux.cfg/default". The file contents would need to be modified to reflect the second server's address. According to various embodiments of the invention, the address in the configuration file may be changed to a macro so that its value is determined on the fly. As such, the configuration file would not have to be changed each time it is deployed to other servers.

As described above, the initial NBP would create and initialize an input memory block. The memory block would specify the name of the configuration file and the value of the address macro used in the configuration file. When the secondary NBP is loaded, it then parses the input memory block, determines the configuration file that it should use, and parses the configuration file. While parsing the configuration file, the secondary NBP encounters the address macro, looks up the value in the memory block, and substitutes the value for the macro.

In this manner, the computer device is capable of booting a special purpose operating system to accomplish an assigned task without the need for immediate user input or intervention.

While described above in reference to the use of configuration files and macros to provide runtime input, the system and method of the present invention may otherwise provide runtime input. According to some embodiments of the invention, boot determination module 202, described above, may be configured to obtain characteristics associated with a requesting computer device, in order to determine the run time parameters needed by the secondary bootstrap program.

The determined runtime parameters may be stored in memory device 114n. The secondary bootstrap program may then be loaded to complete the boot process. The secondary boot process may consult memory block 114n whenever user input would ordinarily be required. Rather than waiting for user input, the bootstrap program is able to continue by reading the appropriate values from memory block 114n.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A method of providing runtime input to a computer device during a network bootstrapping process, comprising:

providing a first set of bootstrap instructions to the computer device, the first set of bootstrap instructions configured to:

determine a configuration file corresponding to the computer device based at least in part on a unique attribute associated with the computer device;

determine one or more values associated with one or more macros in the configuration file; and initialize a memory block with the one or more values associated with the one or more macros; and generating a second set of bootstrap instructions, wherein the second set of bootstrap instructions is configured to parse the memory block to retrieve the one or more values and to initiate the [booting] *bootstrapping* process [of] *on* the computer device.

2. The method of claim 1, wherein the first set of bootstrap instructions configured to initialize the memory block further comprises instructions configured to store the one or more values associated with the one or more macros.

3. The method of claim 2, wherein the first set of bootstrap instructions configured to initialize the memory block further comprises instructions to:

store a signature identifying [the] *an* existence of the memory block; and store a value indicating [the] *a* number of *the* macros [used] in the configuration file.

4. The method of claim 1 wherein the first set of bootstrap instructions is terminated when the second set of bootstrap instructions is generated.

5. The method of claim 1, wherein the second set of bootstrap instructions is launched by the first set of bootstrap instructions.

6. [The] *A* method [of claim 1] *for providing runtime input values to a computer device during a network bootstrapping process, comprising:*

*providing a first set of bootstrap instructions to the computer device;*

*determining a configuration file corresponding to the computer device based at least in part on a unique attribute associated with the computer device;*

*initializing a memory block with parameter values identified in the configuration file; and*

*generating a second set of bootstrap instructions*, wherein the second set of bootstrap instructions is [further] configured to:

determine [what] *the* configuration file *corresponding* to [employ] *the computer device*;

parse the configuration file *corresponding to the computer device*; [and]

parse the memory block to retrieve the *parameter* values [for the macros] identified in the parsed configuration file*; and*

*initiate the bootstrapping process on the computer device with the parameter values retrieved from the parsed memory block.*

7. The method of claim 6, wherein the second set of bootstrap instructions is further configured to determine [what] *the* configuration file *corresponding* to [employ] *the computer device* by parsing the memory block to determine [an appropriate] *the* configuration file *corresponding to the computer device*.

8. The method of claim 6, wherein the second set of bootstrap instructions is further configured to determine [what] *the* configuration file *corresponding* to [employ] *the computer device* by identifying the configuration file from a customized DHCP tag.

9. The method of claim 1, wherein the unique attribute is [the] *a* media access control (MAC) address associated with the computer device.

10. The method of claim 1, wherein the first set of bootstrap instructions is further configured to determine an appropriate boot environment for the computer device.

11. The method of claim 10, wherein the boot environment is PXELINUX.

12. The method of claim 1, wherein the first set of bootstrap instructions configured to initialize the memory block further comprises instructions configured to store [the] *a* name of the determined configuration file.

13. The method of claim 1, wherein the first set of bootstrap instructions is further configured to determine one or more values associated with one or more macros by consulting a device profile associated with the computer device.

14. A system for providing runtime input into a computer device during a network bootstrapping process, comprising:

a first server mechanism configured to provide a first set of bootstrap instructions, the first set of bootstrap instructions including an initialization module and a boot determination module;

a second server mechanism configured to provide one or more configuration files comprising one or more macros, wherein the one or more configuration files control the [boot] *bootstrapping* process [of] *on* the computer device; and a bootstrap loading module, incorporated within the computer device, configured to retrieve and install the first set of bootstrap instructions;

wherein the first set of bootstrap instructions is configured to launch a second set of bootstrap instructions, and wherein the boot determination module comprises:

a mechanism for determining an appropriate boot environment for the computer device;

a mechanism for determining a configuration file associated with the computer device; and a mechanism to determine one or more values associated with the one or more macros in the configuration file.

15. The system of claim 14, wherein the second server mechanism is a TFTP server.

16. The system of claim 14, wherein the initialization module further comprises a memory initialization mechanism for selecting a memory block for storing [boot processing] information *relating to the bootstrapping process*.

17. A computer device capable of accepting runtime input during a network bootstrapping process, comprising:

a bootstrap loading module configured to retrieve and install a first set of bootstrap instructions; and a memory device configured to store one or more values associated with one or more macros in one or more configuration files used in the bootstrapping process;

wherein the first set of bootstrap instructions is configured to:

determine a configuration file corresponding to the computer device;

determine one or more values associated with the one or more macros in the configuration file; and initialize the memory device and store the one or more values associated with the one or more macros.

18. The computer device of claim 17, wherein the bootstrap loading module is configured to contact a server mechanism to retrieve the first set of bootstrap instructions when the device starts up.

19. The computer device of claim 17, wherein the bootstrap loading module is further configured to retrieve a second set of bootstrap instructions.

20. The computer device of claim 19, wherein the second set of bootstrap instructions is configured to parse the configuration file and parse the memory device to retrieve the values for the macros identified in the parsed configuration file, and to use the retrieved values and the configuration file to boot the computer device.

21. A method of providing runtime input to a computer device during a network bootstrapping process, comprising:

providing a first set of bootstrap instructions to the computer device, the first set of bootstrap instructions configured to:

determine a configuration file associated with the computer device;

consult a device profile to determine one or more values associated with one or macros in the configuration file, the one or more values needed to complete the bootstrapping process; and initialize a memory block with the one or more values; and generating a second set of bootstrap instructions, wherein the second set of bootstrap instructions is configured to parse the memory block to retrieve the one or more values to complete the bootstrapping process.

*22. The method of claim 6, wherein the first set of bootstrap instructions initializes the memory block by storing the parameter values identified in the configuration file in the memory block.*

*23. The method of claim 6, wherein the first set of bootstrap instructions is terminated in response to generating the second set of bootstrap instructions.*

*24. The method of claim 6, wherein the first set of bootstrap instructions launches the second set of bootstrap instructions.*

*25. The method of claim 6, wherein the unique attribute comprises a media access control (MAC) address associated with the computer device.*

*26. The method of claim 6, wherein the first set of bootstrap instructions determines an appropriate boot environment for the computer device.*

*27. The method of claim 26, wherein the boot environment is PXELINUX.*

*28. The method of claim 6, wherein the first set of bootstrap instructions initializes the memory block by storing a name of the determined configuration file in the memory block.*

*29. The method of claim 6, wherein the first set of bootstrap instructions identifies the parameter values in the configuration file by consulting a device profile associated with the computer device.*

*30. A system for providing runtime input values to a computer device during a network bootstrapping process, comprising:*

*a first server mechanism configured to provide a first set of bootstrap instructions to the computer device;*

*a second server mechanism configured to provide a configuration file corresponding to the computer device, wherein the configuration file comprises one or more parameter values that control the bootstrapping process on the computer device; and*

*a bootstrap loading module, incorporated within the computer device, configured to retrieve and install the first set of bootstrap instructions on the computer device, wherein the first set of bootstrap instructions is configured to:*

*determine the configuration file corresponding to the computer device based at least in part on a unique attribute associated with the computer device;*

*initialize a memory block with the one or more parameter values in the configuration file; and*

*launch the second set of bootstrap instructions, wherein the second set of bootstrap instructions is configured to:*

*determine the configuration file corresponding to the computer device;*

*parse the configuration file corresponding to the computer device;*

*parse the memory block to retrieve the parameter values identified in the parsed configuration file; and*

*initiate the bootstrapping process on the computer device with the parameter values retrieved from the parsed memory block.*

*31. A computer device for providing runtime input values to a computer device during a network bootstrapping process, comprising:*

*a bootstrap loading module configured to retrieve and install a first set of bootstrap instructions, wherein the first set of bootstrap instructions is configured to:*

*determine a configuration file corresponding to the computer device based at least in part on a unique attribute associated with the computer device; and*

*initialize a memory block with one or more parameter values identified in the configuration file;*

*a memory device configured to store the one or more parameter values in the memory block for use in the bootstrapping process; and*

*a second set of bootstrap instructions, wherein the second set of bootstrap instructions is configured to:*

*determine the configuration file corresponding to the computer device;*

*parse the configuration file corresponding to the computer device;*

*parse the memory block to retrieve the parameter values identified in the parsed configuration file; and*

*initiate the bootstrapping process on the computer device with the parameter values retrieved from the parsed memory block.*

*32. A method for providing runtime input values to a computer device during a network bootstrapping process, comprising:*

*providing a first set of bootstrap instructions to the computer device, the first set of bootstrap instructions configured to:*

*determine a configuration file corresponding to the computer device based at least in part on a unique attribute associated with the computer device;*

*identify one or more parameter values in the configuration file; and*

*initialize a memory block with the one or more parameter values identified in the configuration file; and*

*generating a second set of bootstrap instructions, wherein the second set of bootstrap instructions is configured to:*

*parse the memory block to retrieve the one or more parameter values identified in the configuration file; and*

*initiate the bootstrapping process on the computer device with the parameter values retrieved from the parsed memory block.*

*33. A method of providing runtime parameter value input to a computer device during a network bootstrapping process, comprising:*

*providing a first set of bootstrap instructions to the computer device;*

*determining a configuration file corresponding to the computer device based at least in part on a unique attribute associated with the computer device;*

*initializing a memory block with parameter values identified in the configuration file; and*

*generating a second set of bootstrap instructions, wherein the second set of bootstrap instructions is configured to:*

*determine what configuration file to employ;*

*parse the configuration file;*

*parse the memory block to determine the values of the parameters identified in the configuration file; and*

*initiate the booting process of the computer device.*

* * * * *